(12) United States Patent
Kumar et al.

(10) Patent No.: US 11,232,613 B1
(45) Date of Patent: Jan. 25, 2022

(54) CURVE ANTIALIASING BASED ON CURVE-PIXEL INTERSECTION

(71) Applicant: Adobe Inc., San Jose, CA (US)

(72) Inventors: Harish Kumar, Noida (IN); Anmol Sud, New Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/068,419

(22) Filed: Oct. 12, 2020

(51) Int. Cl.
| | | |
|---|---|---|
| *G06T 11/20* | (2006.01) | |
| *G06T 11/60* | (2006.01) | |
| *G06T 3/40* | (2006.01) | |
| *G06T 11/00* | (2006.01) | |

(52) U.S. Cl.
CPC .............. *G06T 11/203* (2013.01); *G06T 3/40* (2013.01); *G06T 11/001* (2013.01); *G06T 11/60* (2013.01); *G06T 2200/12* (2013.01)

(58) Field of Classification Search
None
See application file for complete search history.

*Primary Examiner* — Vu Nguyen
(74) *Attorney, Agent, or Firm* — FIG. 1 Patents

(57) ABSTRACT

Curve antialiasing based on curve-pixel intersection is leveraged in a digital medium environment. For instance, to apply antialiasing according to techniques described herein, curves of a visual object are mapped from an original pixel space to a virtual pixel space. Virtual pixels of the virtual pixel space that are intersected by the mapped curves are identified and aggregated as intersected virtual pixels. The intersected virtual pixels are then mapped back into the original pixel space to identify which intersected virtual pixels positionally coincide with respective original pixels of the original pixel space. Intersected virtual pixels are mapped to original pixels to generate pixel coverage for original pixels. The generated pixel coverage values for original pixels are applied to render antialiased curves as part of an antialiased version of the original visual object.

20 Claims, 11 Drawing Sheets

Fig. 7

CURVE ANTIALIASING BASED ON CURVE-PIXEL INTERSECTION

BACKGROUND

Digital graphics editing systems are implemented to generate and edit visual objects, such as digitally created visual objects, digital photographs, digital animations, and so forth. Some common graphics editing techniques manipulate fundamental Bézier shapes (e.g., Bézier curves) to generate higher-order geometries. For instance, multiple Bézier shapes are joined to form more complex shapes. To enhance the appearance of visual objects created using Bézier curves, graphics systems often utilize antialiasing techniques to improve the appearance of visual objects by smoothing their edges. Antialiasing, for example, is utilized to attempt to minimize distortion artifacts known as aliasing that often occur when representing a high-resolution image at a lower resolution. Antialiasing is used in digital photography, computer graphics, digital animation, and many other graphics-related applications.

Generally, a number of different antialiasing techniques are current available in conventional graphics systems. For instance, multisampling antialiasing (MSAA) is a technique that uses multiple pixel sampling at the edges of visual objects and averages the edge samples to attempt to smooth color transition at the edges. Due to the aspect of managing multiple pixel samples across multiple edges of a visual object, MSAA is memory and processor intensive. Supersampling antialiasing (SSAA) is another technique which takes several color samples from each pixel along the edge of a visual object and averages the pixel color samples to smooth color transition at the edges. Analogous to MSAA, SSAA maintains multiple color samples for each pixel and is thus memory and processor intensive. Further antialiasing techniques are known as "distance-based techniques" that utilize distances of triangles along the edges of visual objects to estimate alpha values along the edges to generate an antialiased appearance. Distance based techniques, however, do not provide the visual quality of other techniques (e.g., MSAA, SSAA) and are known to have difficulty with thinner edges, e.g., thin Bézier curves.

Thus, antialiasing techniques in conventional graphics systems are burdensome on system resources (e.g., memory and processor bandwidth) and/or do not achieve acceptable visual appearance in edge transitions for visual objects.

SUMMARY

Curve antialiasing based on curve-pixel intersection is leveraged in a digital medium environment. For instance, to apply antialiasing according to techniques described herein, curves of a visual object are mapped from an original pixel space to a virtual pixel space. Virtual pixels of the virtual pixel space that are intersected by the mapped curves are identified and aggregated as intersected virtual pixels. The intersected virtual pixels are then mapped back into the original pixel space to identify which intersected virtual pixels positionally coincide with respective original pixels of the original pixel space. Accordingly, for each original pixel that includes a portion of the input curves, intersected virtual pixels that are mapped to the original pixel are utilized to generate a pixel coverage for the original pixel. The generated pixel coverage values for original pixels that include curve portions in the original pixel space are then applied to render antialiased curves as part of an antialiased version of the original visual object. The antialiasing module, for instance, provides the pixel coverage to a rendering module that renders the antialiased visual object, which is visually displayed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 7 depicts an example of a coverage buffer.

DETAILED DESCRIPTION

Overview

Figure 1:
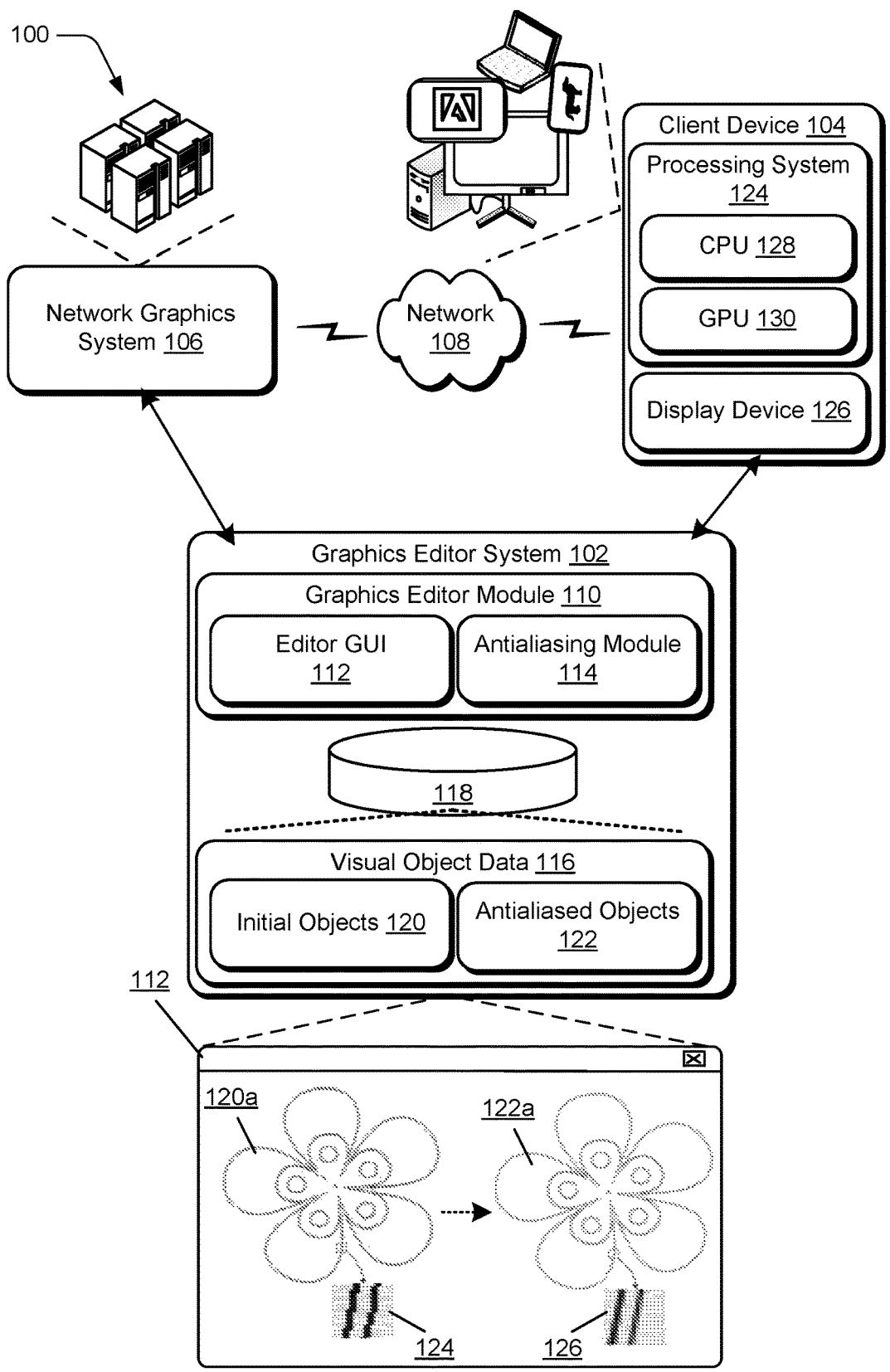
FIG. 1 is an illustration of an environment in an example implementation that is operable to employ techniques described herein.

To overcome the challenges to antialiasing presented in conventional graphics editing systems, curve antialiasing based on curve-pixel intersection is leveraged in a digital medium environment. For instance, to mitigate the challenges of excessive burden on system resources experienced when applying antialiasing to shapes using conventional graphics editing systems, the described graphics editor system implements antialiasing techniques that reduce resource usage (e.g., memory and processor usage) in comparison with conventional antialiasing techniques, while providing high quality shape antialiasing.

Consider, for example, an implementation in which antialiasing is to be applied to a visual object. Generally, antialiasing refers to image processing techniques that minimize distortion artifacts (e.g., "aliasing") in visual objects, such as to smooth edge transitions at curve edges of visual objects. As used herein, a curve refers to a shape that contributes to an overall visual appearance of a visual object, and includes shapes such as lines (e.g., a straight line, a curved line, etc.), Bézier curves, geographical primitives, and so forth. Accordingly, to apply antialiasing according to techniques described herein, curves of a visual object are input to the described antialiasing module and are mapped from an original pixel space to a virtual pixel space. The input curves, for instance, are upscaled by a scale factor into a virtual pixel space that has a higher pixel density than an original pixel space in which the visual object was originally represented.

After mapping the curves into the virtual pixel space, virtual pixels of the virtual pixel space that are intersected by the mapped curves are identified and aggregated as intersected virtual pixels. Generally, at least some virtual pixels of the virtual pixel space are not intersected by the mapped curves, and thus are not included in the intersected virtual pixels. The intersected virtual pixels are then mapped back into the original pixel space to identify which intersected virtual pixels positionally coincide with respective original pixels of the original pixel space. Accordingly, for each original pixel that includes a portion of the input curves, intersected virtual pixels that are mapped to the original pixel are utilized to generate a pixel coverage for the original pixel. In at least one implementation, at least some original pixels of the original pixel space do not include curve portions and are thus are not utilized to generate pixel coverage values.

The generated pixel coverage values for original pixels that include curve portions in the original pixel space are then applied to render antialiased curves as part of an antialiased version of the original visual object. The antialiasing module, for instance, provides the pixel coverage to a rendering module that renders the antialiased visual object which is then visually displayed.

Accordingly, techniques for curve antialiasing based on curve-pixel intersection overcome the deficiencies of traditional techniques for antialiasing. For instance, by utilizing intersected virtual pixels in a virtual pixel space and omitting non-intersected virtual pixels, memory and processor resources are conserved in contrast with conventional antialiasing techniques that process entire blocks of pixels regardless of their content. Further, by generating pixel coverage for original pixels in an original pixel space that include curve portions and ignoring original pixels that do not include curve portions, memory and processor resources are conserved in contrast with conventional antialiasing techniques that generate pixel coverage for entire pixel spaces regardless of their content. In this way, computationally efficient antialiasing provided by the described techniques are leveraged to reduce resource wastage experienced in conventional graphics editing systems and thus increase system efficiency.

In the following discussion, an example environment is first described that employs the techniques described herein. Example scenarios and procedures are then described which are performable in the example environment as well as other environments. Performance of the example scenarios and procedures is not limited to the example environment and the example environment is not limited to performance of the example scenarios and procedures. Finally, an example system and device are described that are representative of one or more computing systems and/or devices that are able to implement the various techniques described herein.

Example Environment

FIG. 1 is an illustration of an environment 100 in an example implementation that is operable to employ curve antialiasing based on curve-pixel intersection as described herein. The illustrated environment 100 includes a graphics editor system 102 that is leveraged to implement techniques for curve antialiasing based on curve-pixel intersection described herein. In this particular example, the graphics editor system 102 is implemented by a client device 104, a network graphics system 106, and/or via interaction between the client device 104 and the network graphics system 106. The client device 104 and the network graphics system 106, for example, are interconnected via a network 108 and thus are configured to communicate with one another to perform various aspects of curve antialiasing based on curve-pixel intersection described herein. Generally, the network 108 represents a combination of wired and wireless networks and is implemented via any suitable architecture, such as a multi-layer communications network comprising multiple edge routers and core routers, wireless nodes positioned at different physical locations, a collection of switches in a single physical location, and so forth.

Examples of computing devices that are used to implement the client device 104 and the network graphics system 106 include a desktop computer, a laptop computer, a mobile device (e.g., assuming a handheld configuration such as a tablet or mobile phone), a server device, and so forth. Additionally, the network graphics system 106 is implementable using a plurality of different devices, such as multiple servers utilized by an enterprise to perform operations "over the cloud" as further described in relation to FIG. 11.

The graphics editor system 102 includes a graphics editor module 110 that is representative of functionality to enable visual objects to be generated and edited in various ways. Accordingly, the graphics editor module 110 implements an editor graphical user interface (GUI) 112 and an antialiasing module 114. Generally, the editor GUI 112 represents functionality for receiving user interaction to perform various visual object editing actions, as well as to output visual indications of visual object editing actions. Further, the antialiasing module 114 represents functionality for applying antialiasing to various visual objects, such as utilizing techniques for curve antialiasing based on curve-pixel intersection.

The graphics editor system 102 further includes visual object data 116 stored on a storage 118. Generally, the visual object data 116 represents data that is utilized by and results from operation of the graphics editor module 110. The visual object data 116, for instance, includes initial visual objects ("initial objects") 120 and antialiased visual objects ("antialiased objects") 122. The initial objects 120 represent different visual objects that are generated in a variety of different ways, such as obtained from a visual object source (e.g., the network graphics system 106), generated via user interaction with the graphics editor module 110, and so forth. Examples of the initial objects 120 include graphical objects (e.g., bitmap images), Bézier shapes, geometric primitives, 3-dimensional (3D) shapes, and so forth. The antialiased objects 122 represent initial objects 120 that are processed by the antialiasing module 114 by applying techniques for curve antialiasing based on curve-pixel intersection. The initial objects 120, for example, are antialiased by the antialiasing module 114 to generate the antialiased objects 122.

To enable various aspects of the techniques described herein the client device 104 includes a processing system 124 and a display device 126. The processing system 124 is implemented at least in part in hardware and is configured to perform data processing for the various tasks herein. The processing system 124, for example, includes a central processing unit (CPU) 128 and a graphics processing unit (GPU) 130. Data processing tasks of the techniques described herein, for example, are performed by the CPU 128, the GPU 130, and/or cooperatively by the CPU 128 and the GPU 130. In at least one implementation, various computational tasks described herein are performed via GPU compute kernels (e.g., vertex shaders, pixel shaders, and so forth) that are invoked via the GPU 130 to enable antialiasing tasks to be performed according to the described techniques. Further example attributes of the processing system 124 are described below with reference to the processing system 1104 described with reference to FIG. 11.

The display device 126 represents functionality for visual output of various aspects of techniques for curve antialiasing based on curve-pixel intersection. The display device 126, for instance, outputs the editor GUI 112, and is operable to receive user interaction to perform various aspects of the described techniques. A user, for example, provides input to the editor GUI 112 to invoke the antialiasing module 114. Additionally, functionality of the antialiasing module 114 is automatically invocable (e.g., by the graphics editor module 110), such as in response to receiving and/or generating instances of the initial objects 120.

The environment 100 further depicts an initial object 120*a* to which antialiasing is applied by the antialiasing module 114 to generate an antialiased object 122*a*. Further, an initial curve segment 124 is illustrated that represents a magnified portion of an edge curve of the initial object 120*a*, and an antialiased curve segment 126 is illustrated that represents a magnified portion of an edge curve of the antialiased object 122*a*. The antialiased curve segment 126, for example, represents the initial curve segment 124 with antialiasing applied by the antialiasing module 114.

Notice that the initial curve segment 124 illustrates that without antialiasing, curve edges of the initial object 120*a* include harsh visual transitions along the edges. However, after antialiasing by the antialiasing module 114, the antialiased curve segment 126 displays smoother visual transitions along curve edges of the antialiased object 122*a*. In at least one implementation, this causes the antialiased object 122*a* to have a more pleasing visual appearance than the initial object 120*a*, particularly when displayed at lower resolutions.

Having considered an example environment and system, consider now a discussion of some example details of the techniques for curve antialiasing based on curve-pixel intersection in a digital medium environment in accordance with one or more implementations.

Implementation Details

Figure 2:
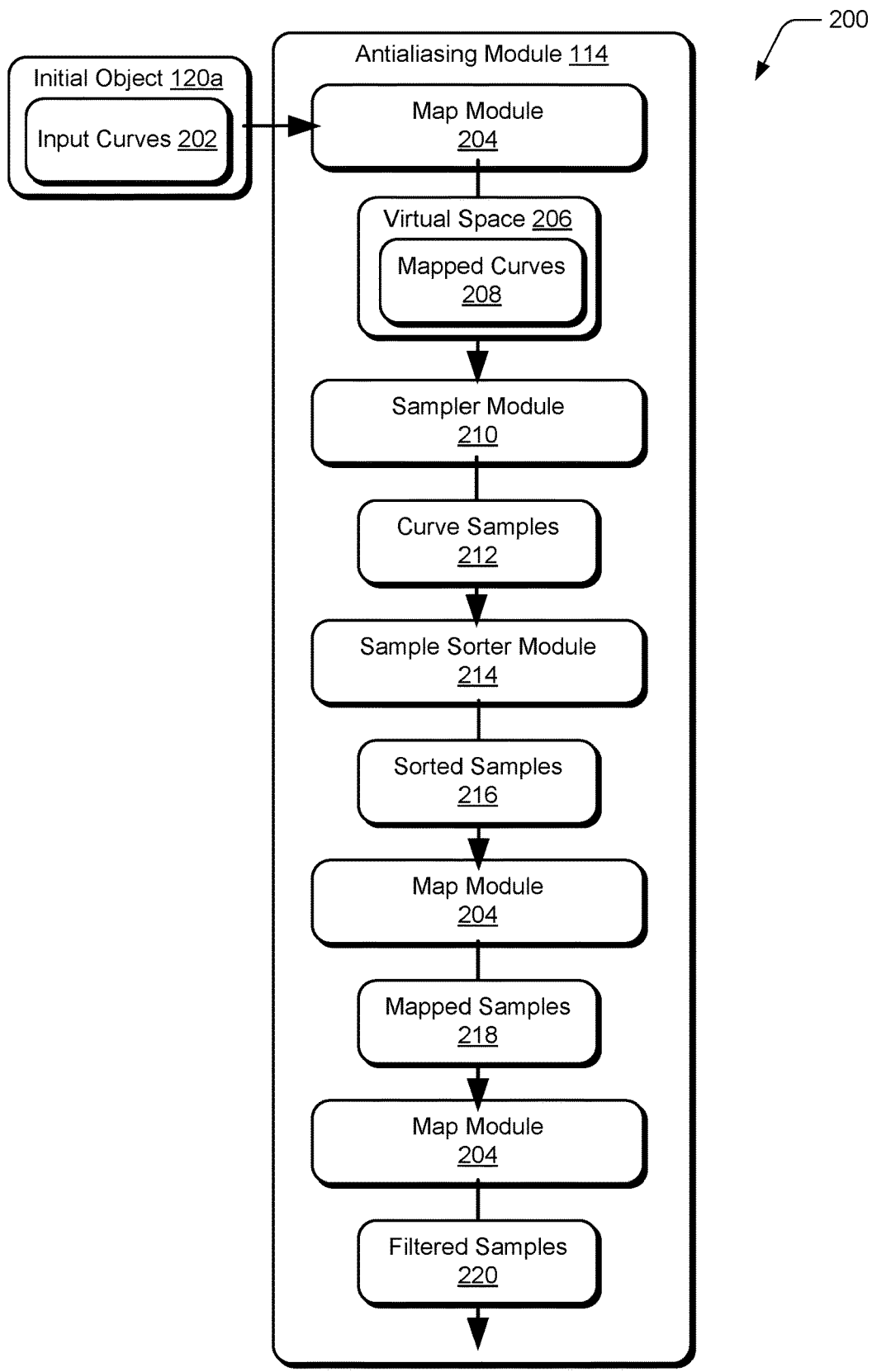
FIG. 2 depicts an example system for applying antialiasing according to the techniques described herein.

FIGS. 2-7 depict different implementation details for curve antialiasing based on curve-pixel intersection in accordance with one or more implementations. For instance, FIG. 2 depicts an example system 200 for applying antialiasing according to the techniques described herein. The system 200, for example, describes implementation of the antialiasing module 114 via various modules that perform different operations. Generally, the various modules discussed herein are implementable in hardware, firmware, software, and/or combinations thereof. In at least some implementations, the various operations of the antialiasing module 114 are performed via compute kernels that are invoked for performing specific computational tasks, such as via the GPU 130.

In an example implementation, the initial object 120*a* including input curves 202 are input to the antialiasing module 114 to enable antialiasing to be applied to the initial object 120*a*. Generally, the initial object 120*a* includes a collection of different curves (e.g., Bézier curves) including the input curves 202 that combine to generate a visual appearance of the initial object 120*a*. While the various operations below are discussed in the context of the input curves 202, it is to be appreciated that the operations are applied to other curves of the initial object 120*a* as part of applying antialiasing.

A map module 204 processes the input curves 202 and maps the input curves 202 into a virtual pixel space ("virtual space") 206 to generate mapped curves 208. The map module 204, for example, generates the mapped curves 208 by performing matrix multiplication on the input curves 202 to upscale a geometry of the input curves 202 by a specified scaling factor, e.g., X times an original scale of the input curves 202. For instance, consider an implementation 400 depicted in FIG. 4 for generating the mapped curves 208. The implementation 400 includes an example of the input curves 202 in an original pixel space ("original space") 402 prior to processing by the map module 204. The original space 402 includes six different pixels ("original pixels") P1-P6 and the input curves 202 include 3 different curves C1-C3 that are positioned in the original space 402.

Further to the implementation 400, the input curves 202 are processed by the map module 204 and mapped to the virtual space 206. Generally, this is done by scaling the input curves 202 into a higher coordinate space represented by the virtual space 206. The map module 204, for example, scales the input curves 202 by a scale factor X, and in this example X=4. Thus, each original pixel P from the original pixel space 402 is represented in the virtual space 206 as a 4×4 grid of virtual pixels. Further, the virtual space 206 is divided into horizontal lines $S_0$-$S_7$ that are utilized for further processing of the mapped curves 208. Generally, the mapped curves 208 are represented in the virtual space 206 as curves C1', C2', C3'. This particular implementation of the virtual space 206 is presented for purpose of example only, and it is to be appreciated that a wide variety of different scale factors and virtual space configurations are able to be utilized within the scope of the described implementations.

Returning to FIG. 2, a sampler module 210 processes the mapped curves 208 to generate curve samples 212. The curve samples 212, for instance, represent virtual pixels from the virtual space 206 where the mapped curves 208 intersect with the horizontal lines S of the virtual space. Consider, for example, an implementation 500 depicted in FIG. 5 for generating the curve samples 212. In the implementation 500, the sampler module 210 processes the mapped curves 208 to identify virtual pixels at which the mapped curves 208 intersect the horizontal lines S in the virtual space 206. Generally, these intersection points are aggregated as the curve samples 212. The curve samples 212, for instance, include intersected virtual pixels $I_1$-$I_{29}$, which represent virtual pixels along the horizontal lines S where the mapped curves 208 intersect. To enable further processing, pixel positions (i.e., coordinate positions of the virtual pixels I) of the curve samples 212 are saved in memory. In at least one implementation, other portions of the virtual space 206 (e.g., non-intersected virtual pixels) are not saved as part of the curve samples 212. Generally, this enables a decrease in memory usage as compared with conventional antialiasing techniques.

Returning to FIG. 2, a sample sorter module 214 processes the curve samples 212 and sorts them based on their association with respective mapped curves 208 to generate sorted samples 216. For instance, Table 1 below depicts association of curve samples 212 with respective curves. Generally, Table 1 represents an instance of the sorted samples 216.

TABLE 1

| | Curve | | |
|---|---|---|---|
| | C1' | C2' | C3' |
| Pixel Samples | $I_1$-$I_{11}$ | $I_{12}$-$I_{22}$ | $I_{23}$-$I_{29}$ |

Figure 6:
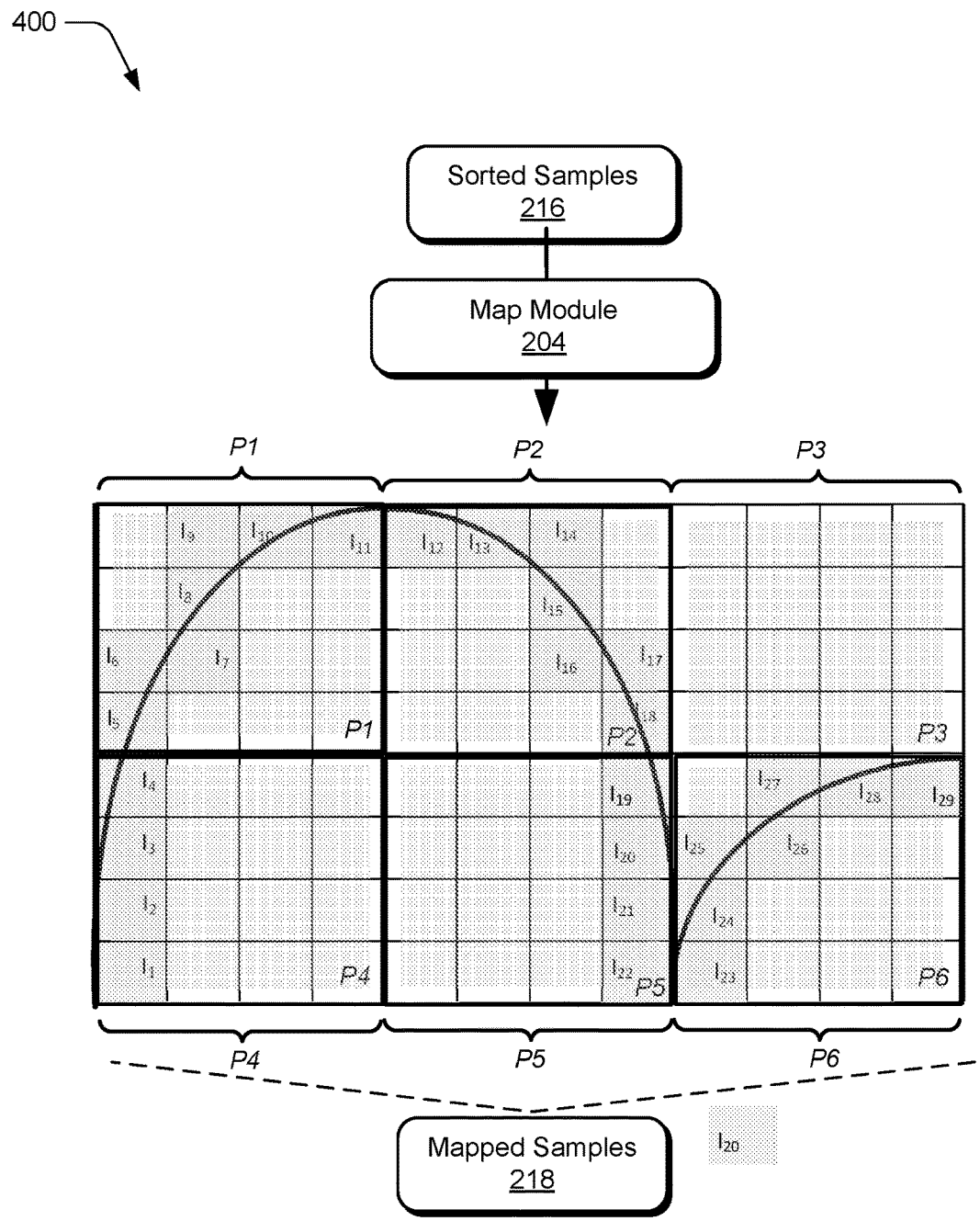
FIG. 6 depicts an implementation that illustrates mapped samples as an association of sorted samples with original pixels from an original space.

Generally, this association of curves with curves samples is generated based on their association in the virtual space 206. However, to enable the curve samples 212 to be utilized for antialiasing the input curves 202, the map module 204 maps the sorted samples 216 back to the original pixels P from the original pixel space 402 depicted in FIG. 4 to generate mapped samples 218. Accordingly, FIG. 6 depicts an implementation 600 that illustrates the mapped samples 218 as an association of the sorted samples 216 with the original pixels P1-P6 from the original space 402. Table 2 represents an illustration of association of the sorted samples 216 with respective pixels P:

TABLE 2

| Pixel | P1 | P2 | P3 | P4 | P5 | P6 |
|---|---|---|---|---|---|---|
| Sorted Samples | $I_9, I_{10}, I_{11},$ $I_8, I_6, I_7,$ $I_5$ | $I_{12}, I_{13},$ $I_{14}, I_{15},$ $I_{16}, I_{17}, I_{18}$ | | $I_4, I_3, I_2,$ $I_1$ | $I_{19}, I_{20},$ $I_{21}, I_{22}$ | $I_{27}, I_{28},$ $I_{29}, I_{25},$ $I_{26}, I_{24}, I_{23}$ |

In at least one implementation, mapping the sorted samples 216 to generate the mapped samples 218 utilizes Equation 1:

$$P_x = \frac{V_x}{X}, P_y = \frac{V_y}{Y}$$

Where $P_X$, $P_Y$ is a sample position (e.g., coordinate position) in the original pixel space 402, and $V_X$, $V_Y$ is the sample position (e.g., coordinate position) in the virtual space 206.

While Table 2 shows an example correlation between pixels and sorted samples 216, in at least one implementation the samples are stored in a single contiguous memory block such as depicted in Memory Block N below:
Block N
$I_9, I_{10}, I_{11}, I_8, I_6, I_7, I_5, I_{12}, I_{13}, I_{14}, I_{15}, I_{16}, I_{17}, I_{18}, I_4, I_3,$
$I_2, I_1, I_{19}, I_{20}, I_{21}, I_{22}, I_{27}, I_{28}, I_{29}, I_{25}, I_{26}, I_{24}, I_{23}$ To further conserve memory and other computing resources, the techniques described herein enable redundant pixel values (e.g., mapped samples 218) to be removed. Accordingly, the map module 204 processes the mapped samples 218 to identify duplicate samples and generate filtered samples 220. For instance, in the example presented in these implementations, notice that the curves [C1, C2, C3] and [C1', C2', C3'] do not overlap one another at any position. Accordingly, there is no instance of the mapped samples 218 that is common to multiple of the curves C, e.g., none of the I values is shared by two or more curves. Thus, the filtered samples 220 in this example are identical to the mapped samples 218 since no duplicate samples are identified.

However, consider a different scenario with the following Block N' of curve samples from a different set of curves:
Block N'
$I_{1'}, I_{2'}, I_{3'}, I_{4'}, I_{5'}, I_{6'}, I_{7'}, I_{8'}$
Consider further that in the Block N', samples $I_{4'}, I_{5'}$ are overlapping in a virtual space, e.g., coincide in a same instance of a virtual pixel. Accordingly, the map module 204 inspects the virtual samples and detects that the samples $I_{4'}, I_{5'}$ are overlapping and generates the following Array 1 that identifies unique samples in the Block N':
Array 1
1, 1, 1, 1, 0, 1, 1, 1

In generating the Array 1, the zero value indicates that the fifth sample $I_{5'}$ is a duplicate of $I_{4'}$ and is thus to be filtered out (e.g., ignored) for subsequent processing. Generally, the map module 204 detects duplicate samples by comparing position information (e.g., coordinate values) for samples (e.g., the mapped samples 218) in the virtual space 206 and for a sample that has a duplicate position to another (e.g., previous) sample, the sample is represented with a zero.

Figure 3:
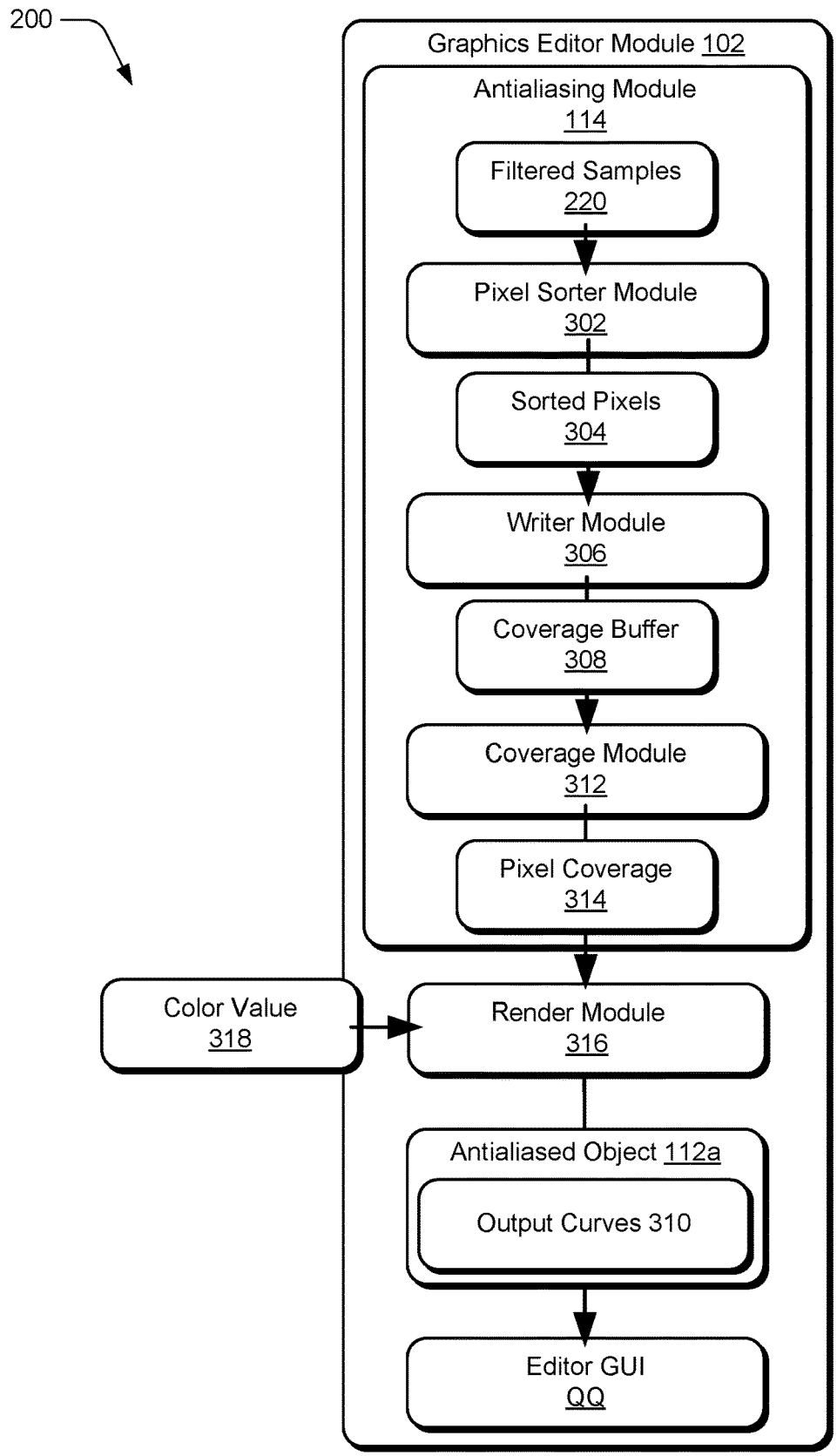
FIG. 3 depicts further operation of the system introduced in FIG. 2.

FIG. 3 depicts further operation of the system 200. In FIG. 3, a pixel sorter module 302 processes the filtered samples 220 to generate sorted pixels 304. The pixel sorter module 302, for example, maps each filtered sample 220 to a respective pixel P from the original space 206. In at least one implementation, the mapping utilizes Equation 1 (above) to map samples (e.g., the filtered samples 220) from the virtual space 206 to the original space 206 based on their respective coordinates in each space.

To illustrate, consider the mapped samples illustrated in FIG. 6 in view of Table 2 above with shows correlation of samples to particular pixels from the original space 206. Accordingly, to generate the sorted pixels 304, the pixel sorter module 302 generates Array 2 which starts with pixel P1 and marks the first non-duplicate sample as unique for each pixel:
Array 2
0, 0, 0, 0, 0, 0, 0, 1, 0, 0, 0, 0, 0, 0, 1, 0, 0, 0, 1, 0, 0, 0, 1, 0, 0, 0, 0, 0, 0

For instance, to generate Array 2, the pixel sorter module 302 starts with a first sample (e.g., $I_1$) and iterates through each sample comparing a pixel location of a current sample and a previous sample. Using Formula 1, for example, the pixel sorter module 302 down samples both the filtered samples 220 to the original space 206. If both the samples point to the same original pixel, the pixel sorter module 302 marks a "0" in Array 1, indicating that a current pixel position of the sample is not unique, e.g., it resides in a same pixel position as a previous sample. If the pixel sorter module 302 determines that the pixel position of the current sample is not the same as the previous sample (e.g., it resides in a different pixel P), the pixel sorter module marks a "1" in the array indicating that there is a new pixel in the array.

In one example implementation, with reference to FIG. 6, the pixel sorter module 302 starts in the upper left corner of the mapped samples 218 and proceeds left to right, top to bottom through the pixels P to generate Array 2. For instance, sample $I_9$ is the first sample of P1 and the pixel sorter module 302 marks a "0" for each sample in P1 until it transitions from $I_5$ to $I_{12}$, at which point it marks a "1" to indicate a transition to a new pixel, P2. Thus, the pixel sorter module 302 proceeds through all of the pixels P accordingly. Notice that no samples reside in pixel P3, and thus the pixel sorter module 302 skips P3 and proceeds to P4.

Accordingly, after generating Array 2, the pixel sorter module 302 counts the number of pixels represented in Array 2. In at least one implementation, this is done utilizing a prefix sum algorithm that processes Array 2 and keeps a cumulative total of values from Array 2. Accordingly, the result of processing Array 2 provides Array 3:
Array 3
0, 0, 0, 0, 0, 0, 0, 1, 1, 1, 1, 1, 1, 1, 2, 2, 2, 2, 3, 3, 3, 3, 4, 4, 4, 4, 4, 4, 4

Thus, Array 3 indicates that the sorted pixels 304 include 5 different pixels, e.g., based on values 0-5. For instance, since P3 includes no samples (e.g., no curve sections), only pixels P1, P2, and P4-P6 are considered.

Figure 7:
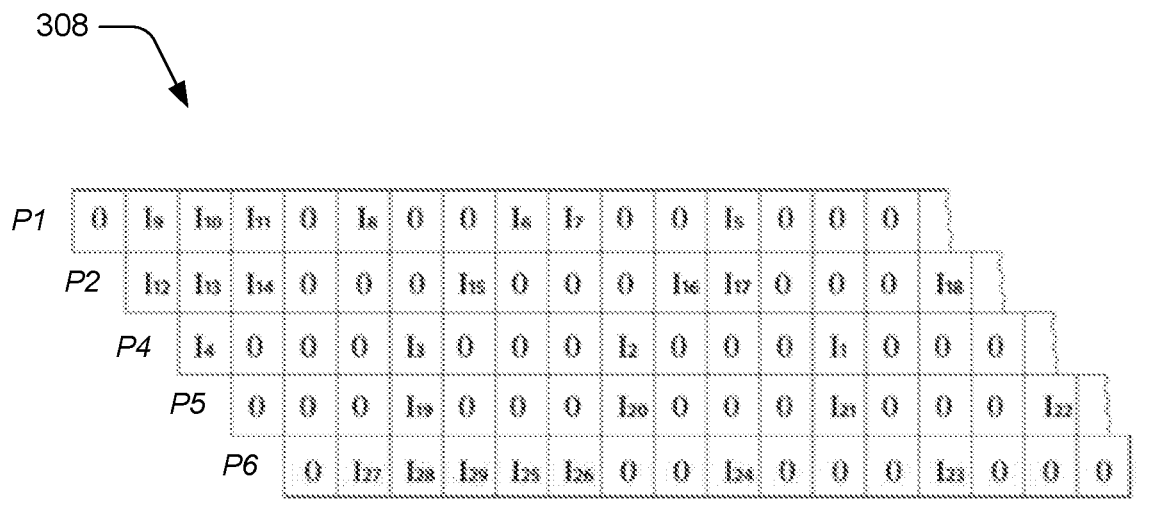

Proceeding, a writer module 306 processes the sorted pixels 304 and generates a coverage buffer 308 that represents a portion of memory for applying antialiasing to the input curves 202. FIG. 7 depicts an example of the coverage buffer 308. The writer module 306, for instance, utilizes the number of pixels identified from Array 3 to allocate the coverage buffer 308. For example, in contrast with conventional antialiasing techniques which typically allocate memory for all pixels in a pixel space, the writer module 306 allocates memory for only unique pixels, e.g., original pixels that are identified above has including samples. In at least one implementation, a buffer of $X^2$ bytes of the size of the number of unique pixels is allocated (with X representing the scaling factor used to generate the mapped curves 208), e.g., of a size U. In at least one implementation, U is significantly smaller than the total pixels on a screen on which the antialiased object 122a is to be displayed since only intersected and non-duplicate pixels are represented in the coverage buffer 308. Generally, this provides for enhanced memory conservation in comparison with conventional antialiasing techniques which typically process and represent entire blocks of pixels without consideration of whether the pixels include curve portions to be antialiased.

Accordingly, with the coverage buffer 308 allocated, the writer module 306 uses a position of each filtered sample 220 to determine a location for the sample in the coverage buffer 308 and to write "1" at the determined location. Equation 2 represents an example equation for determining sample location:

$$i_s = X^2 * L[i] + X * (V_x \bmod X) + (V_y \bmod X) \qquad \text{Equation 2}$$

where $i_s$ is the position in allocated memory (e.g., the coverage buffer 308), L[i] is the $i^{th}$ element of the list from Array 3, and $V_x$, $V_y$ are sample positions in the virtual space 206.

Accordingly, the coverage buffer 308 depicted in FIG. 7 illustrates the filtered samples in their respective pixel positions within the buffer. While the samples are depicted with reference to their labels utilized in the drawings (e.g., $I_9$, $I_{10}$, etc.), it is to be appreciated that in operation the sample positions will typically be written as a "1" value in a corresponding byte representation of the coverage buffer 308.

Continuing with the discussion of FIG. 3, to render antialiased output curves 310 as part of the antialiased object 122a, a coverage module 312 reads the coverage buffer 308 and generates pixel coverage 314 that indicates pixel shading for each pixel represented in the coverage buffer 308, e.g., alpha values for individual pixels P. In at least one implementation, the coverage module 312 utilizes Equation 3 to calculate the pixel coverage 314.

$$C_p = \sum_{i=0}^{X^2} VC_i / X^2 \qquad \text{Equation 3}$$

where $C_p$ is the pixel coverage for a pixel P, X is the scaling factor utilized to map the input curves 202 to the virtual space 206, and $VC_i$ is the $i^{th}$ sample generated for a pixel. Generally, $VC_i$ is either 0 or 1, based on whether the $i^{th}$ scaled virtual sample was generated.

A render module 316 of the graphics editor module 110 utilizes the pixel coverage 314 to process a color value 318 and generate the antialiased object 122a including the output curves 310. The color value 318 is specified via color values according to any suitable color space, such as red green blue (RGB), hue saturation brightness (HSL and/or HSV), and so forth. The render module 316, for example, performs alpha multiplication with the pixel coverage 314 and the color value 318 to generate the output curves 310, which represent antialiased versions of the input curves 202. The antialiased object 122a is then output via the editor GUI 112 such as displayed on the display device 126 of the client device 104. Having discussed some implementation details, consider now some example methods for curve antialiasing based on curve-pixel intersection.

Figure 8:
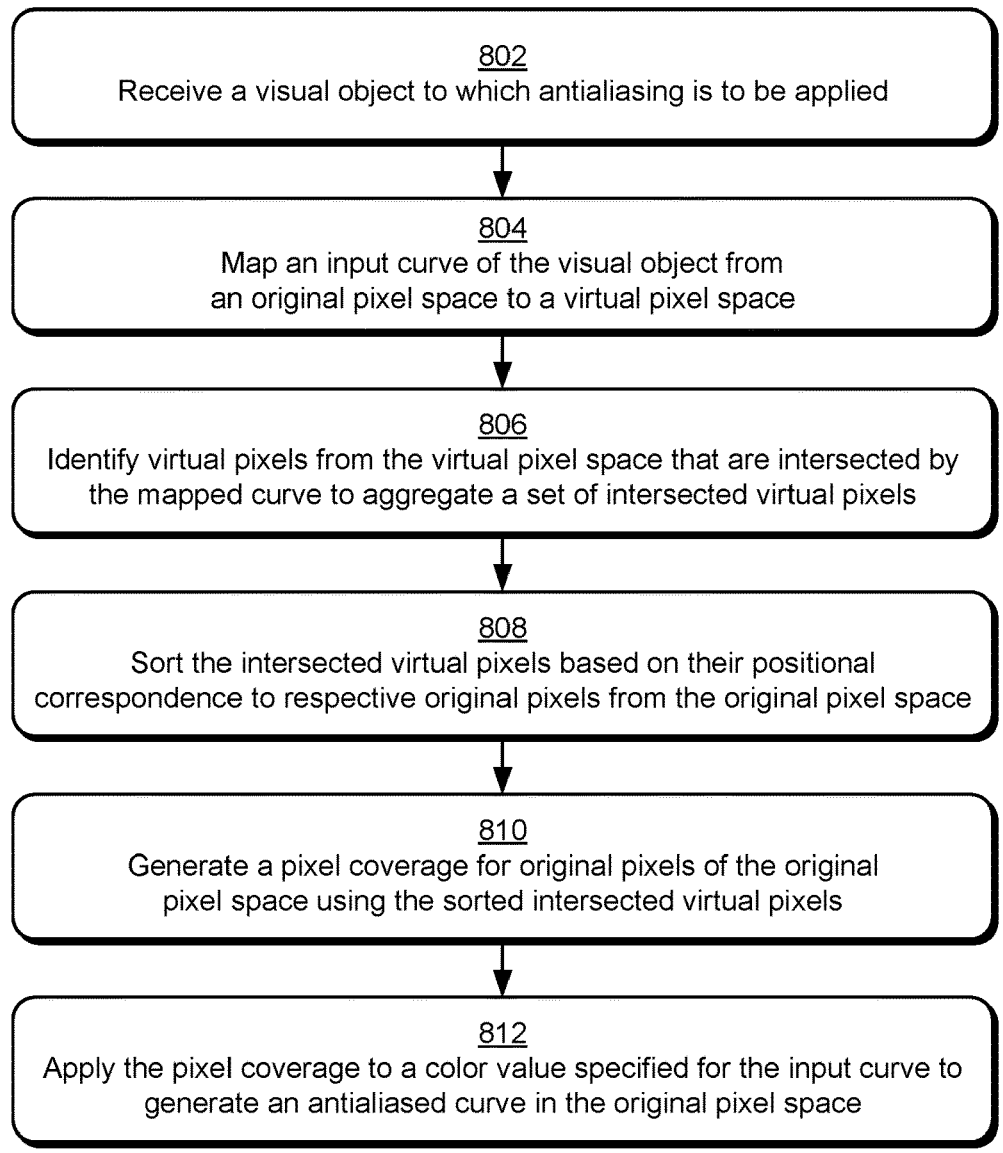
FIG. 8 depicts an example procedure for curve antialiasing based on curve-pixel intersection.

FIG. 8 depicts an example method 800 for curve antialiasing based on curve-pixel intersection. The method, for instance, is performed by the graphics editor module 110 utilizing the antialiasing module 114. Step 802 receives a visual object to which antialiasing is to be applied. The graphics editor module 110, for example, receives a visual object (e.g., an initial object 120) and initiates a process for applying antialiasing to the visual object. Generally, an antialiasing process is initiated in various ways, such as automatically by the graphics editor module 110, in response to user input requesting antialiasing, by the graphics editor module 110 in response to detecting that antialiasing will improve a visual appearance of a visual object, and so forth.

Step 804 maps an input curve of the visual object from an original pixel space to a virtual pixel space. The map module 204, for example, maps the input curves 202 from the original space 402 to the virtual space 206. As depicted previously, the virtual space 206 includes a higher pixel density than the original space 402. Generally, the mapping includes scaling the input curve by a particular scale factor and mapping the scaled input curve into the virtual space.

Step 806 identifies virtual pixels from the virtual pixel space that are intersected by the mapped curve to aggregate a set of intersected virtual pixels. For instance, the sampler module 210 processes the mapped curves 208 to identify virtual pixels in the virtual space 206 that are intersected by the mapped curves 208 to generate the curve samples 212. Generally, the curve samples 212 represent instances of virtual pixels of the virtual space 206 that are interested by the mapped curves 208.

Step 808 sorts the intersected virtual pixels based on their positional correspondence to respective original pixels from the original pixel space. For example, the sample sorter module 214 sorts the curve samples 212 based on their associated with the mapped curves 208 to generate the sorted samples 216. The map module 204 then maps the sorted samples 216 back into the original space 402 to generate the mapped samples 218. The pixel sorter module 302 sorts the mapped samples based on their respective associations with pixels P of the original space 402 to generate the sorted pixels 304. As discussed above, the sorted pixels 304 generally represent a correlation of intersected virtual pixels from the virtual space 206 with corresponding pixels P from the original space 402. In at least one implementation, the map module 204 filters duplicate samples out of the mapped samples 218 to generate the filtered samples 220, which are used by the pixel sorter module 302 to generate the sorted pixels 304.

Step 810 generates a pixel coverage for original pixels of the original pixel space using the sorted intersected virtual pixels. The writer module 306, for example, writes the sorted pixels 304 into memory, such as to generate the coverage buffer 308. The coverage module 312 reads the coverage buffer 308 and generates the pixel coverage 314. As discussed above, the pixel coverage 314 represents pixel shading for each pixel represented in the coverage buffer 308, e.g., alpha values for individual pixels P of the original space 402.

Step 812 applies the pixel coverage to a color value specified for the input curve in the original pixel space to generate an antialiased curve in the original pixel space. The render module 316, for example, renders the output curves 310 in the original space 402 utilizing the pixel coverage 314 and as part of the antialiased object 122a. In at least one implementation, the antialiased object 122a is output in the editor GUI 112.

Figure 9:
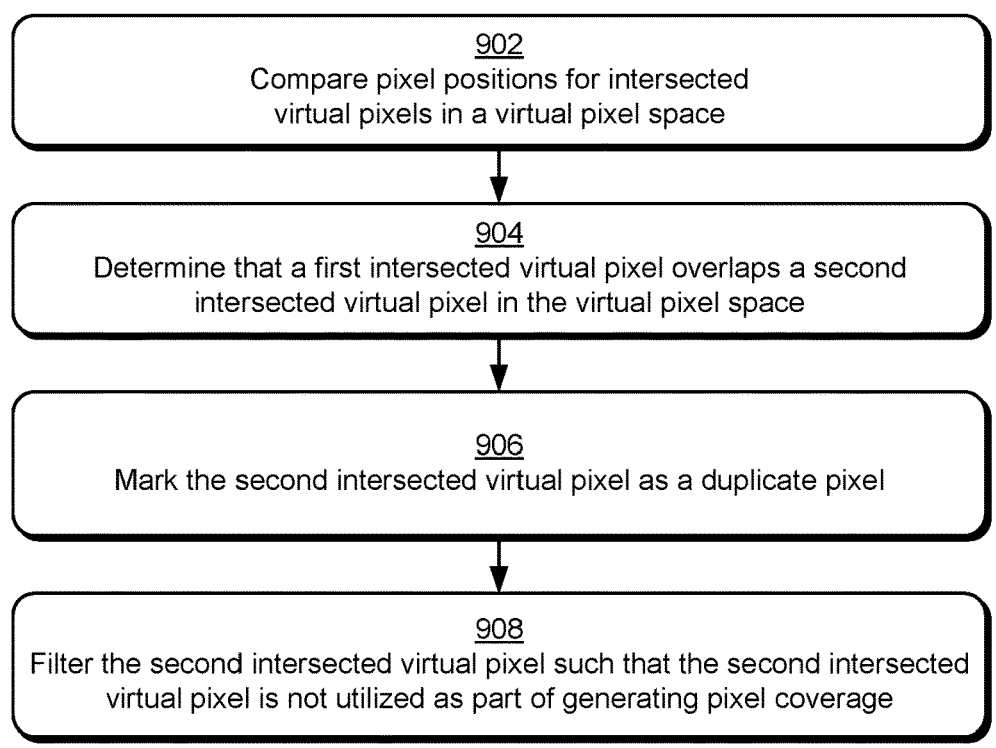
FIG. 9 depicts an example procedure for filtering duplicate pixels.

FIG. 9 depicts an example method 900 for filtering duplicate pixels. The method, for instance, is performed by the graphics editor module 110 utilizing the antialiasing module 114 and in conjunction with the method 800 described above.

Figure 4:
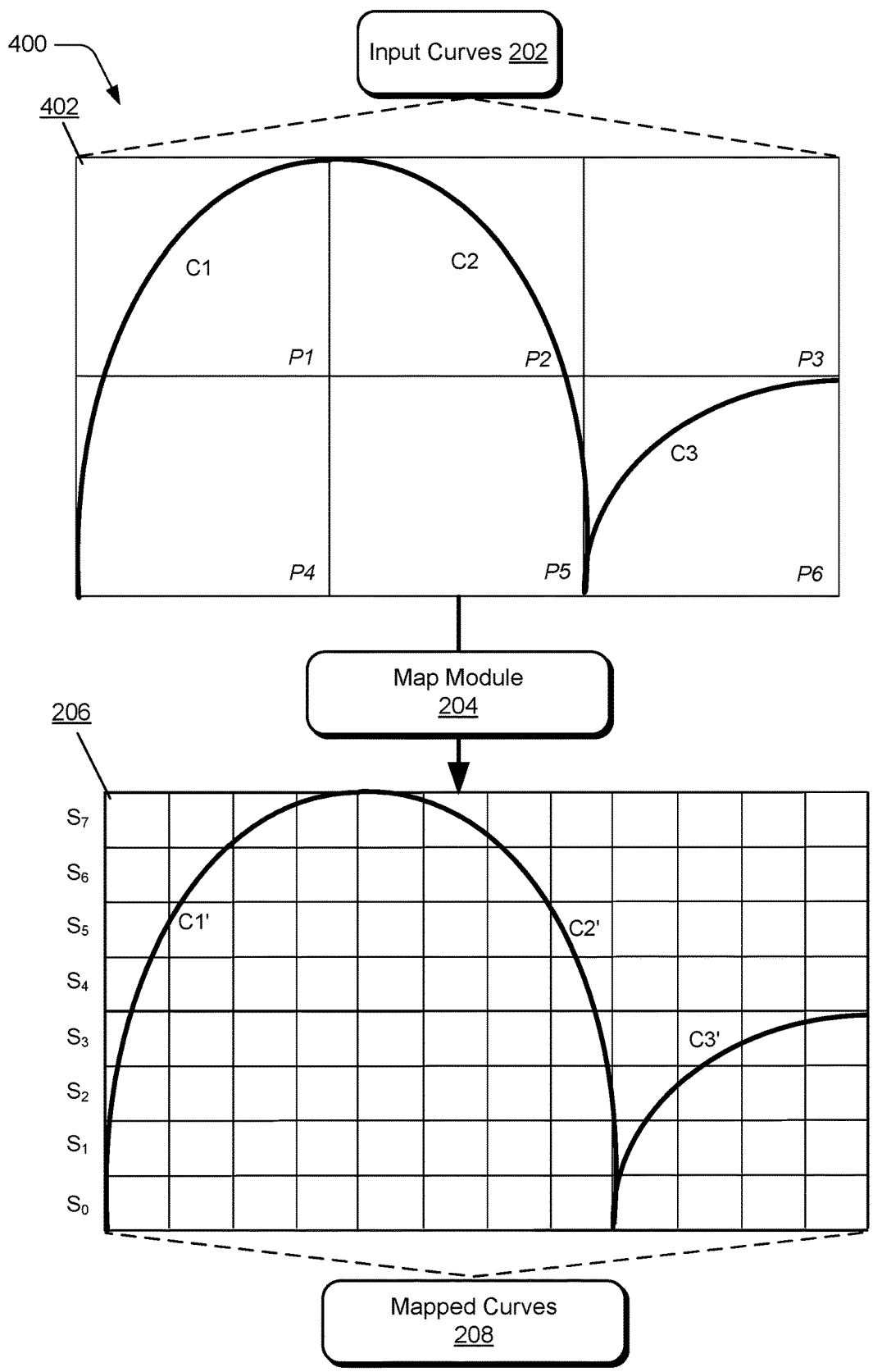
FIG. 4 depicts an example implementation for generating mapped curves.
Figure 5:
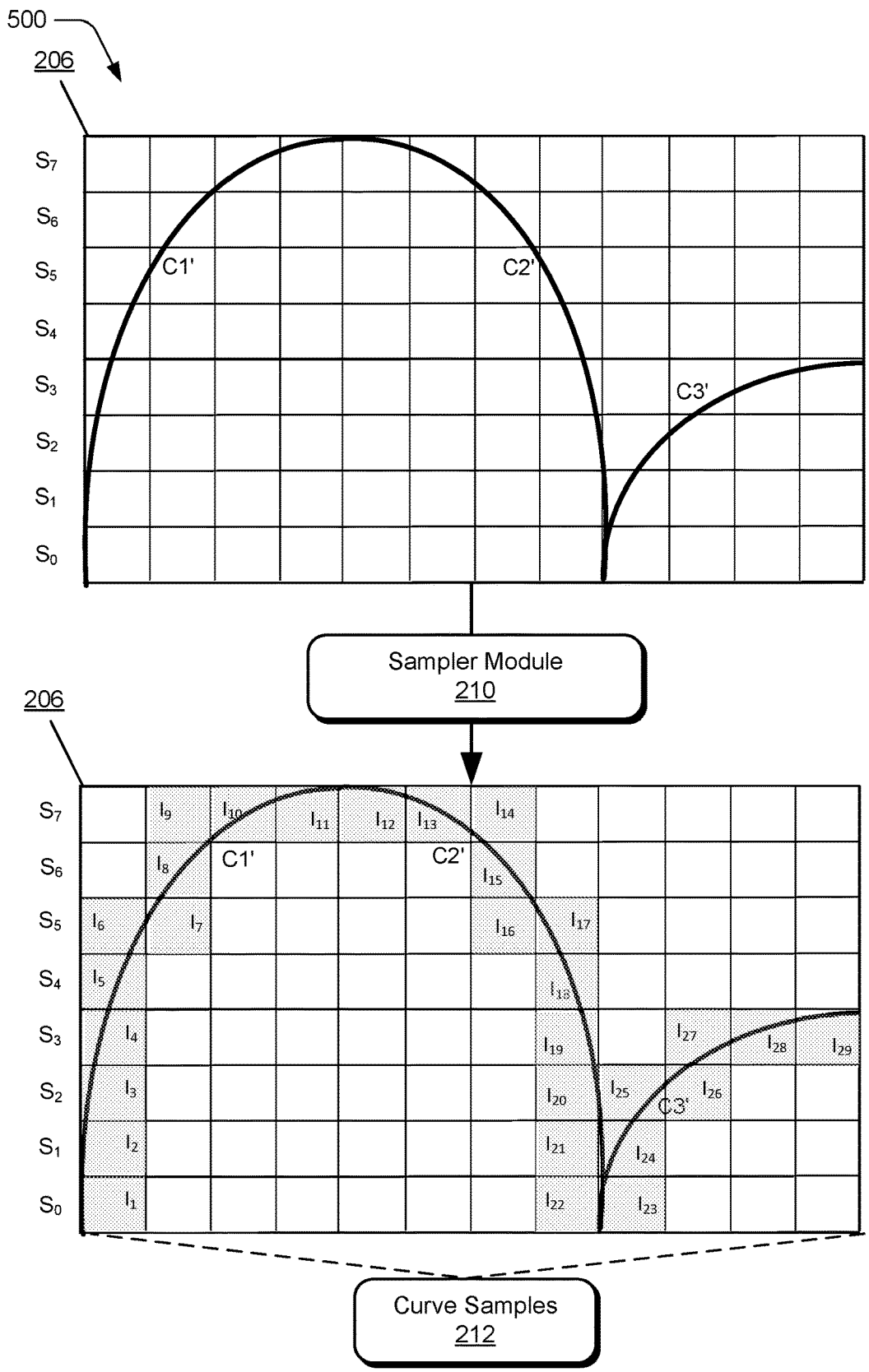
FIG. 5 depicts an example implementation for generating curve samples.

Step 902 compares pixel positions for intersected virtual pixels in a virtual pixel space. The map module 204, for instance, compares pixel positions for the intersected virtual pixels I in the virtual space 206, such as depicted in FIGS. 4 and 5. In at least one implementation, the map module 204 utilizes coordinates (e.g., x and y coordinates) from the virtual space 206 to compare the pixel positions.

Step 904 determines that a first intersected virtual pixel overlaps a second intersected virtual pixel in the virtual pixel space. For example, the map module 204 determines that based on comparing the pixel positions, a pixel position for two or more of the mapped samples 218 overlap, e.g., are the same pixel position.

Step 906 marks the second intersected virtual pixel as a duplicate pixel. The map module 204, for instance, configures a data representation of the second intersected pixel to indicate that the pixel is a duplicate pixel. For example, in a memory array that identifies virtual intersected pixels (e.g., Array 1 discussed above), the second intersected virtual pixel is identified as a duplicate pixel.

Step 908 filters the second intersected virtual pixel such that the second intersected virtual pixel is not utilized as part of generating pixel coverage. The second intersected virtual pixel, for example, is not utilized as part of generating the pixel coverage 314. For instance, the pixel sorter module 302 does not utilize the second intersected virtual pixel to generate the sorted pixels 304, e.g., the second intersected virtual pixel is omitted from the sorted pixels 304.

Figure 10:
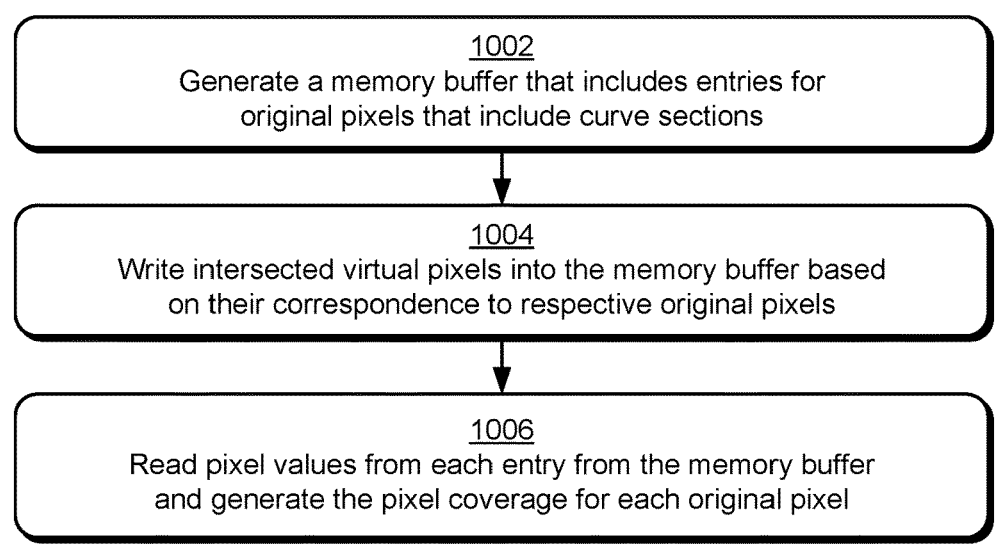
FIG. 10 depicts an example procedure for generating a pixel coverage for antialiasing.

FIG. 10 depicts an example method 1000 for generating a pixel coverage for antialiasing. The method, for instance, is performed by the graphics editor module 110 utilizing the antialiasing module 114 and in conjunction with the method 800 described above.

Step 1002 generates a memory buffer that includes entries for original pixels that include curve sections. The writer module 306, for instance, generates the coverage buffer 308 based on pixels from the original space 402 that include curve portions. In at least one implementation, the writer module 306 does not include an entry in the coverage buffer 308 for a particular original pixel that does not include a curve section. In generating the sorted pixels 304, for instance, the pixel sorter module 302 skips pixels P from the original space 402 that do not include curve portions. Accordingly, the skipped pixels are not utilized by the writer module 306 as part of generating the coverage buffer 308.

Step 1004 writes intersected virtual pixels into the memory buffer based on their correspondence to respective original pixels. The writer module 306, for example, writes data values for the intersected virtual pixels identified in the sorted pixels 304 into the coverage buffer 308.

Step 1006 reads pixel values from each entry from the memory buffer and generates the pixel coverage for each original pixel. For instance, the coverage module 312 reads the data values from the coverage buffer 308 to generate the pixel coverage. In at least one implementation, the pixel coverage 314 for each original pixel P is generated by dividing the pixel values from the coverage buffer 308 by a scale factor used to generate the virtual space 206, such as utilizing Equation 3 detailed above. Accordingly, the pixel coverage is utilized by the render module 316 to generate an antialiased curve as part of an antialiased visual object.

The example methods described above are performable in various ways, such as for implementing different aspects of the systems and scenarios described herein. For instance, aspects of the methods are implemented by the graphics editor module 110 and various aspects of the methods are implemented via the different GUIs described above. Generally, any services, components, modules, methods, and/or operations described herein are able to be implemented using software, firmware, hardware (e.g., fixed logic circuitry), manual processing, or any combination thereof. Some operations of the described methods, for example, are described in the general context of executable instructions stored on computer-readable storage memory that is local and/or remote to a computer processing system, and implementations include software applications, programs, functions, and the like. Alternatively or in addition, any of the functionality described herein is performable, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations are able to be performed in any order to perform a method, or an alternate method.

Accordingly, the described techniques provide automated processes for antialiasing visual objects. Having described example procedures in accordance with one or more implementations, consider now an example system and device that are able to be utilized to implement the various techniques described herein.

Example System and Device

Figure 11:
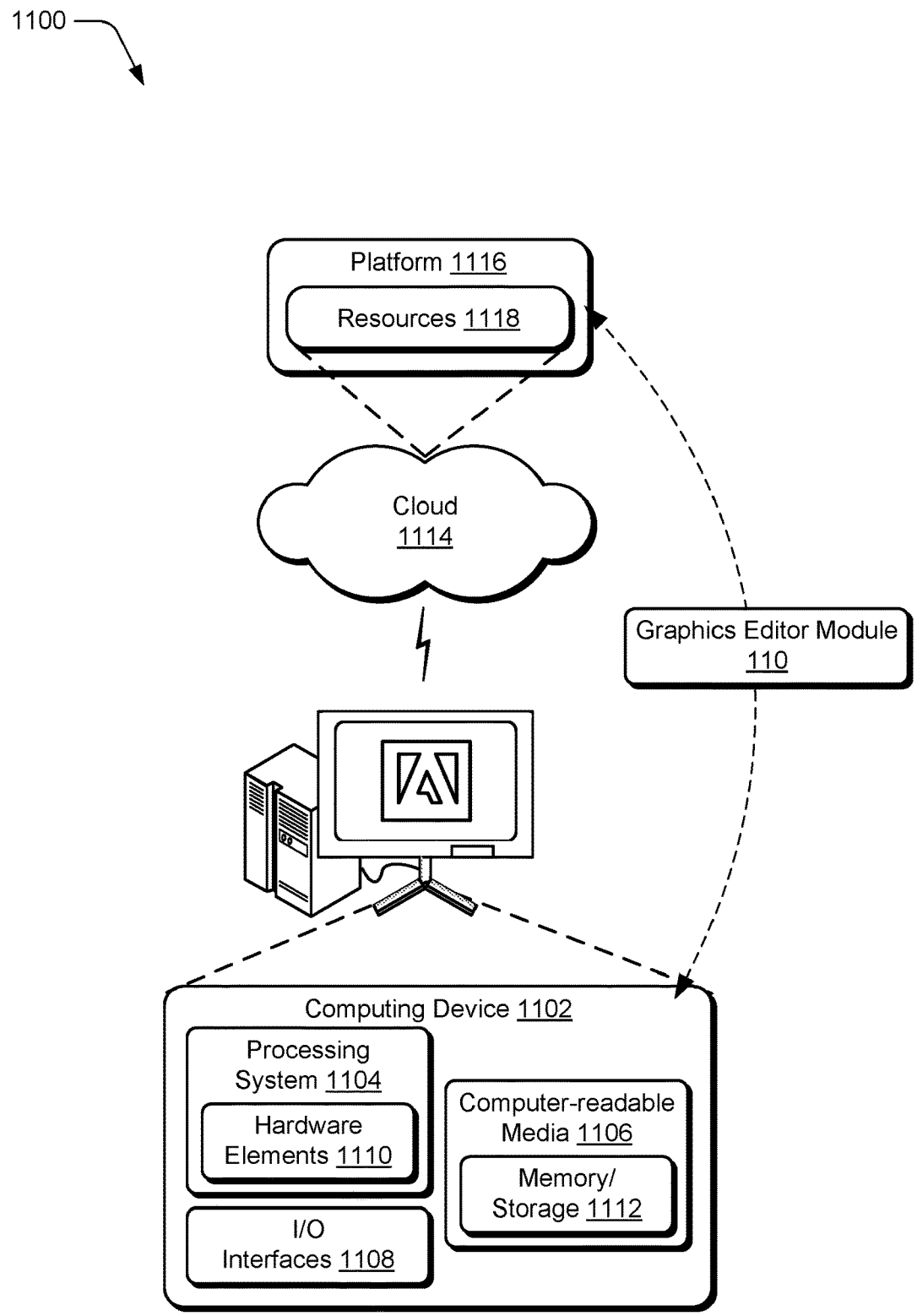
FIG. 11 illustrates an example system including various components of an example device that are implementable as any type of computing device as described and/or utilized with reference to FIGS. 1-10 to implement aspects of the techniques described herein.

FIG. 11 illustrates an example system 1100 that includes an example computing device 1102 that is representative of one or more computing systems and/or devices that are usable to implement the various techniques described herein. This is illustrated through inclusion of the graphics editor module 110. The computing device 1102 includes, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that are be configured as processors, functional blocks, and so forth. This includes example implementations in hardware as an application specific integrated circuit or other logic device formed using one or more semiconductors. The hardware elements 1110 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1106 is illustrated as including memory/storage 1112. The memory/storage 1112 represents memory/storage capacity associated with one or more computer-readable media. In one example, the memory/storage component 1112 includes volatile media (such as random access memory (RANI)) and/or nonvolatile media (such as read only memory (ROM), Flash memory, optical disks, magnetic disks, and so forth). In another example, the memory/storage component 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1110. For example, the computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supportable by various configurations of the computing device 1102 and are not limited to the specific examples of the techniques described herein. This functionality is also implementable entirely or partially through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. For example, the resources 1118 include applications and/or data that are utilized while computer processing is executed on servers that are remote from the computing device 1102. In some examples, the resources 1118 also include services provided over the Internet and/or through a subscriber network, such as a cellular or Wi-Fi network.

The platform 1116 abstracts the resources 1118 and functions to connect the computing device 1102 with other computing devices. In some examples, the platform 1116 also serves to abstract scaling of resources to provide a corresponding level of scale to encountered demand for the resources that are implemented via the platform. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for generating an antialiased curve implemented by at least one computing device, the method comprising:
    mapping, by a graphics editor system of the at least one computing device, an input curve from an original pixel space to a virtual pixel space that includes a higher pixel density than the original pixel space;
    identifying, by the at least one computing device, virtual pixels from the virtual pixel space that are intersected by the mapped curve to aggregate a set of intersected virtual pixels;
    generating, by the at least one computing device, a pixel coverage for original pixels of the original pixel space by sorting the intersected virtual pixels based on their positional correspondence to respective original pixels from the original pixel space; and
    applying, by the at least one computing device, the pixel coverage to a color value specified for the input curve in the original pixel space to generate an antialiased curve in the original pixel space.

2. A method as described in claim 1, further comprising generating, by the at least one computing device, the virtual pixel space by scaling the original pixel space by a scale factor, and wherein said generating the pixel coverage for a particular original pixel is based on the scale factor applied to a number of intersected virtual pixels that correspond to the particular original pixel.

3. A method as described in claim 1, wherein the set of intersected virtual pixels excludes at least some virtual pixels of the virtual pixel space.

4. A method as described in claim 1, wherein a particular original pixel of the original pixel space is represented by a set of virtual pixels in the virtual pixel space, and the intersected virtual pixels utilized to generate the pixel coverage for the particular original pixel comprise less than all virtual pixels of the set of virtual pixels.

5. A method as described in claim 1, wherein said generating the pixel coverage excludes one or more non-intersected pixels from the virtual pixel space.

6. A method as described in claim 1, further comprising:
    determining, by the at least one computing device, that a first intersected virtual pixel overlaps a second intersected virtual pixel in the virtual pixel space; and
    marking, by the at least one computing device, the second intersected virtual pixel as a duplicate pixel such that the second intersected virtual pixel is not utilized as part of said generating the pixel coverage.

7. A method as described in claim 1, wherein a particular original pixel of the original pixel space does not include a curve section for the input curve, and wherein the pixel coverage does not include the particular original pixel.

8. A method as described in claim 1, wherein a particular original pixel of the original pixel space does not include a curve section for the input curve, and wherein the method further comprises:
    generating, by the at least one computing device, a memory buffer that includes entries for original pixels that include curve sections but does not include an entry for the particular original pixel; and
    writing, by the at least one computing device, the intersected virtual pixels into the memory buffer based on their correspondence to respective original pixels.

9. A method as described in claim 8, wherein said generating the pixel coverage comprises reading pixel values from each entry from the memory buffer and dividing the pixel values by a scale factor used to generate the virtual pixel space to generate the pixel coverage for each original pixel.

10. In a digital medium graphics editing environment, a system comprising:
    an antialiasing module implemented at least partially in hardware of at least one computing device to:
        map an input curve from an original pixel space to a virtual pixel space that includes a higher pixel density than the original pixel space;
        identify virtual pixels from the virtual pixel space that are intersected by the mapped curve to aggregate a set of intersected virtual pixels; and
        generate a pixel coverage for original pixels of the original pixel space by sorting the intersected virtual pixels based on their positional correspondence to respective original pixels from the original pixel space; and
    a render module implemented at least partially in the hardware of the at least one computing device to apply the pixel coverage to a color value specified for the input curve in the original pixel space to generate an antialiased curve in the original pixel space.

11. A system as described in claim 10, wherein the antialiasing module is implemented to generate the virtual pixel space by scaling the original pixel space by a scale factor, and to generate the pixel coverage for a particular original pixel based on the scale factor applied to a number of intersected virtual pixels that correspond to the particular original pixel.

12. A system as described in claim 10, wherein the antialiasing module is implemented to represent a particular original pixel from the original pixel space using a set of virtual pixels in the virtual pixel space, and identify intersected virtual pixels for the particular original pixel as less than all virtual pixels of the set of virtual pixels.

13. A system as described in claim 10, wherein the antialiasing module is implemented to:
   determine that a first intersected virtual pixel overlaps a second intersected virtual pixel in the virtual pixel space; and
   mark the second intersected virtual pixel as a duplicate pixel such that the second intersected virtual pixel is not utilized as part of said generating the pixel coverage.

14. A system as described in claim 10, wherein a particular original pixel of the original pixel space does not include a curve section for the input curve, and wherein the antialiasing module is implemented to:
   generate a memory buffer that includes entries for original pixels that include curve sections but does not include an entry for the particular original pixel; and
   write the intersected virtual pixels into the memory buffer based on their correspondence to respective original pixels.

15. A system as described in claim 14, wherein the antialiasing module is implemented to generate the pixel coverage by reading pixel values from each entry from the memory buffer and dividing the pixel values by a scale factor used to generate the virtual pixel space to generate the pixel coverage for each original pixel.

16. One or more non-transitory computer-readable storage media having instructions stored thereon that, responsive to execution by a computing device, causes the computing device to perform operations comprising:
   mapping an input curve from an original pixel space to a virtual pixel space that includes a higher pixel density than the original pixel space;
   identifying virtual pixels from the virtual pixel space that are intersected by the mapped curve to aggregate a set of intersected virtual pixels, the set of intersected virtual pixels excluding at least some virtual pixels of the virtual pixel space;
   generating a pixel coverage for original pixels of the original pixel space by sorting the intersected virtual pixels based on their positional correspondence to respective original pixels from the original pixel space; and
   applying the pixel coverage to a color value specified for the input curve in the original pixel space to generate an antialiased curve in the original pixel space.

17. One or more non-transitory computer-readable storage media as recited in claim 16, wherein the set of intersected virtual pixels excludes at least some virtual pixels of the virtual pixel space, and said generating the pixel coverage excludes one or more non-intersected pixels from the virtual pixel space.

18. One or more non-transitory computer-readable storage media as recited in claim 16, wherein a particular original pixel of the original pixel space is represented by a set of virtual pixels in the virtual pixel space, and the intersected virtual pixels utilized to generate the pixel coverage for the particular original pixel comprise less than all virtual pixels of the set of virtual pixels.

19. One or more non-transitory computer-readable storage media as recited in claim 16, wherein the operations further comprise:
   determining that a first intersected virtual pixel overlaps a second intersected virtual pixel in the virtual pixel space; and
   marking the second intersected virtual pixel as a duplicate pixel such that the second intersected virtual pixel is not utilized as part of said generating the pixel coverage.

20. One or more non-transitory computer-readable storage media as recited in claim 16, wherein a particular original pixel of the original pixel space does not include a curve section for the input curve, the operations further comprising:
   generating a memory buffer that includes entries for original pixels that include curve sections but does not include an entry for the particular original pixel;
   writing the intersected virtual pixels into the memory buffer based on their correspondence to respective original pixels; and
   reading pixel values from each entry from the memory buffer and dividing the pixel values by a scale factor used to generate the virtual pixel space to generate the pixel coverage for each original pixel.

* * * * *